united States Patent Office 3,244,478
Patented Apr. 5, 1966

3,244,478
PROCESSES AND COMPOSITIONS FOR
CONDITIONING PHOSPHATES
Norman Earl Stahlheber, Columbia, Ill., assignor to
Monsanto Company, a corporation of Delaware
No Drawing. Filed July 24, 1961, Ser. No. 125,947
10 Claims. (Cl. 23—108)

This invention relates to process for reducing the normal tendency of phosphatic materials to cake, and to novel phosphatic compositions that resist caking.

The tendency for particulated (powdered, granular, or flaked) monocalcium orthophosphate monohydrate (MCP) to cake, or to form large, hard lumps, when it is exposed to a relatively high humidity for an extended period of time, is well known. Several attempts have been made to eliminate this undesirable tendency by utilizing procedures which were known to have solved similar problems with respect to other hygroscopic salts. However, to date, none of these has been considered completely successful.

It is an object of this invention to make available a stabilized monocalicum orthophosphate monohydrate which upon exposure to relatively high humidity conditions, resists the normal tendency of monocalcium orthophosphate monohydrate to cake.

It is another object of this invention to provide a method whereby an acceptably flow-conditioned monocalcium orthophosphate monohydrate product can be produced.

It is still another object of this invention to make available a new form of calcium disodium pyrophosphate tetrahydrate which is particularly useful as an anti-caking agent for monocalcium orthophosphate monohydrate.

It is still another object of this invention to provide a new method for the production of calcium disodium pyrophosphate and its tetrahydrate.

The first two of the above objects, as well as others, can be achieved by blending into particulated monocalcium orthophosphate monohydrate (MCP) a small amount of a finely divided "mixed cation" pyrophosphate such as, for example, calcium disodium pyrophosphate. The third and fourth objects listed above can be accomplished by reacting (in an aqueous medium) sodium acid pyrophosphate with calcium hydroxide.

The term "mixed cation" pyrophosphate is intended herein to encompass inorganic pyrophosphates having the formula:

$$MA_2P_2O_7$$

wherein M is an alkaline earth metal cation such as calcium, magnesium, strontium, etc. (and preferably either calcium or magnesium), and A is an alkali metal cation, and preferably is sodium. Both the crystalline and the amorphous forms of the mixed cation pyrophosphates are effective in inhibiting the normal caking tendencies of MCP. It is preferred, however, that a new and unexpected form of calcium disodium pyrophosphate (i.e. the amorphous tetrahydrate) be utilized.

While, in order to improve the caking properties of particulated MCP, very small amounts of finely divided mixed cation pyrophosphates are effective, usually at least about 0.5 weight percent (based on the weight of the MCP) of the mixed cation pyrophosphates will ordinarily be interspersed through the MCP in the practice of this aspect of the invention. For optimum results in this application, usually at least about 0.75 weight percent of one of the finely divided mixed cation pyrophosphates should be mixed with the MCP. There is no critical upper limitation as to the amount of mixed cation pyrophosphates that can be interdispersed through the particulated MCP in the practice of the invention. As a practical matter, however, usually not more than about 10 weight percent is utilized. When one of the preferred mixed cation pyrophosphates are utilized, usually not more than about 7 weight percent (based on the weight of MCP) of it is present in the "inhibited" MCP compositions.

Apparently, some of the substantial benefits which are achieved by intermixing the mixed cation pyrophosphates into the MCP according to the practice of this invention result from the adherence of the additives onto the surfaces of the particles of MCP. Nevertheless, for excellent anti-caking results, finely divided mixed cation pyrophosphates need only to be interspersed reasonably well through the MCP. Sufficiently good dispersion can be accomplished, for example, in practically any conventional mixer or blender. The particulated MCP and the mixed cation pyrophosphate need only be intermixed in the appropriate proportions in a conventional ribbon-type mixer, for example, for about 5 minutes in order to achieve an excellent degree of dispersion of the anti-caking additive through the MCP.

The term "finely divided," as applied to the monoalkaline earth metal disodium pyrophosphates in this specification and the appended claims means those mixed cation pyrophosphate products having sufficiently small particles to pass largely (i.e. at least about 70 weight percent) through a U.S. Standard 325-mesh screen. The particles are (smaller than about $44\mu$ in diameter). With respect to the preferred amorphous form of the calcium disodium pyrophosphate tetrahydrate (which will be described in greater detail below), the average particle size is ordinarily inherently much smaller than $44\mu$. For example, the amorphous tetrahydrate has been found to be extremely effective when its average particle size (diameter) is below about 7–10 mircons, which particle size usually results directly from the processes of this invention described below.

In order to produce calcium disodium pyrophosphate which is largely in the amorphous form (that is, more than about 50 weight percent, and usually more than 70 weight percent is amorphous, as determined by conventional X-ray diffraction techniques), the preferred process is an unexpected one; the reaction of sodium acid pyrophosphate ($Na_2H_2P_2O_7$) in an aqueous medium with calcium hydroxide. The reaction which is utilized in this aspect of the invention is:

$$Na_2H_2P_2O_7 + Ca(OH)_2 + 2H_2O \rightarrow Na_2CaP_2O_7 \cdot 4H_2O$$

Ordinarily, the ratio of sodium acid pyrophosphate to calcium hydroxide in the above reaction is such that upon its completion, the reaction will result in a pH of the aqueous medium between about 6 and about 10.5, and preferably between about 7 and about 10. Final pH's within these desirable ranges can result when the molar ratio of sodium acid pyrophosphate to calcium hydroxide is between about 0.7 and about 1.3, and preferably between about 0.85 and about 1.1. When a manufacturer of the novel calcium disodium pyrophosphate of this invention desires to maintain the amount of water-soluble material in the calcium disodium pyrophosphate product at a minimum, he must charge (into the particular aqueous media employed) his raw materials at molar ratios (of sodium acid pyrophosphate to calcium base) between about 0.85 and about 1.0.

The temperature of the reaction media during the above-described reaction apparently has no effect whatever upon the excellent performance of the final calcium disodium pyrophosphate product as an anti-caking agent for MCP. In consideration of the effect of such factors as viscosity and slurry concentration, and the fact that a small amount of heat is evolved during the reaction, the aqueous reaction media are preferably at a temperature between about 20° C. and about 85° C. before the reaction is begun. While relatively higher temperatures result in higher rates of reaction, the actual rate of reaction, too, has apparently no effect upon the performance of the resulting largely amorphous calcium disodium pyrophosphate products as anti-caking agents for MCP.

Nor does the order of addition of the sodium acid pyrophosphate and calcium hydroxide (or calcium oxide) to the reaction vessel have any noticeable effect upon the physical characteristics of the product which results, or upon its overall performance in this invention. The calcium oxide or hydroxide can, for example, be first slurried into water. Then the resulting slurry can be intermixed with the proper amount of sodium acid pyrophosphate in a suitable conventional reaction vessel. The sodium acid pyrophosphate can be predissolved in a small amount of water if desired. Or, if desired, particulated sodium acid pyrophosphate can be premixed with the calcium oxide or hydroxide before the resulting blend is slurried into water in the reaction vessel. As another example, sodium acid pyrophosphate can be predissolved in water. Then the calcium hydroxide or oxide can be added to the sodium acid pyrophosphate solution in the reaction vessel.

Since it dissolves readily in the aqueous media employed in this process, the particle size of the sodium acid pyrophosphate which is utilized in this invention is not at all critical. The particles of the water-insoluble calcium bases which are utilized, however, must be fairly small in order for the reaction with sodium acid pyrophosphate to be completed within a fairly short period of time. For example, when calcium oxide or calcium hydroxide are reacted with sodium acid pyrophosphate, the reaction is complete after only about 15 minutes if substantially all of the particles of the calcium base are small enough to pass through a U.S. Standard 200-mesh screen. By comparison, if the particles of calcium hydroxide, for example, are so large that the greater proportion of them cannot pass through a U.S. Standard 100-mesh screen, more than 45 minutes may be required for this material to react completely with an equivalent amount of sodium acid pyrophosphate. It is preferred, therefore, that in the practice of this invention the particles of the particular water-insoluble calcium base which is utilized be so small that at least 80 weight percent of them can pass through a U.S. Standard 200-mesh screen.

Because calcium hydroxide is insoluble in water, the reaction of sodium acid pyrophosphate with it will be taking place in what appears to be a slurry, or a fluid paste. As the reaction proceeds, the viscosity of this "reaction" slurry increases to a point at which, the slurry becomes almost immobile, and cannot be agitated except with very high-powered mixing equipment unless the reacting "solids" (proportion of the slurry which is not volatile at 110° C.) are maintained below about 35 weight percent. For this reason it is preferred that, where one's mixing equipment is not capable of handling very viscous fluids, for example, the reaction slurry "solids" be maintained below about 25 weight percent. Concurrently, the water level in the slurry should be at least about 65 weight percent and preferably at least about 75 weight percent of the slurry. After the very viscous stage in the above-described reaction (which generally occurs about midway in the reaction period), the viscosity of the slurry decreases considerably, and no further difficulty with viscosity is encountered through the remainder of the reaction period.

After the reaction of the sodium acid pyrophosphate with the calcium hydroxide has progressed sufficiently (so that the pH of the slurry is constant and within the desired range), the water is removed by any appropriate procedure desired. The only precaution that one need observe during the removal of the water from the slurry of water and the calcuim disodium pyrophosphate tetrahydrate product (which resulted from the reaction described heretofore) is that if one desires to preserve the product in the form of the tetrahydrate, he should not permit the temperature of the product from the above-described reaction to rise above about 130° C. for an extended period of time. Slurries containing the largely amorphous calcium disodium pyrophosphate tetrahydrate of this invention can be drum-dried, for example, or even spray-dried, utilizing conventional techniques, without substantial loss of the product's water of crystallization, provided the temperature of this preferred mixed cation pyrophosphate is maintained below about 130° C. Also, the slurry can be filtered, and the filter cake washed, if desired (to remove water-soluble salts that might be contained therein), before it is dried. The presence of reasonable amounts of impurities, such as unreacted sodium acid pyrophosphate and calcium hydroxide, in the calcium disodium pyrophosphate tetrahydrate product, however, does not noticeably decrease its effectiveness as an anti-caking agent. For example, the presence of 15 weight percent of calcium hydroxide and/or sodium acid pyrophosphate has apparently no detrimental effect whatever upon the ability of largely amorphous calcium disodium pyrophosphate to reduce the tendency of MCP to cake.

When the calcium disodium pyrophosphate is dried, its individual particles sometimes loosely stick together forming flakes or granules which are larger than desired for its efficient performance as an anti-caking agent for MCP. When such agglomeration occurs, a single pass through a conventional powder grinder such as, for example, a conventional hammer mill is usually sufficient to produce a product having the desired small particles. If the grinding of the dried product is objectionable, it has been found that the presence of at least about 15 weight percent (based on the weight of the calcium disodium pyrophosphate) of a finely divided (more than 80 weight percent can be passed through a U.S. Standard 100-mesh screen) inorganic siliceous material such as sodium silico aluminate, calcium aluminum silicate, etc., in the slurry during the drying step causes the dried product to remain in a very finely divided state, thus often eliminating the necessity for the above-described grinding step. The presence of even as much as 60 weight percent of the finely divided inorganic siliceous material in the calcium disodium pyrophosphate apparently has no detrimental effect upon its performance as an anti-caking agent for MCP.

While it can be observed that the above discussion has been directed largely toward the preferred new form of calcium disodium pyrophosphate tetrahydrate (the amorphous form) it should be noted that the invention is not limited to the use of the amorphous form of the tetrahydrate as an anti-caking agent. Most of the substantial benefits of this invention can also be observed when finely divided anhydrous amorphous calcium disodium pyrophosphate and/or the crystalline form of the tetrahydrate, as well as magnesium disodium pyrophosphate, calcium dipotassium pyrophosphate, magnesium dipotassium pyrophosphate, etc. are intermixed with MCP.

Nor is the utility of the novel largely amorphous calcium disodium pyrophosphate of this invention confined to that of an anti-caking agent. Other uses for which this compound is peculiarly suited include its application as a mild abrasive in dentifrices, as an "inert" insecticide, and as a concentrated source of calcium and phosphate in the fields of human and animal nutrition.

In the following examples which are illustrative of some of the preferred embodiments of this invention, all parts are by weight unless otherwise specified. Example I illustrates one procedure for prepairng calcium disodium pyrophosphate tetrahydrate which is largely in the amorphous form; that is, which contains most of the calcium disodium pyrophosphate in the amorphous state.

EXAMPLE I

Into a conventional stainless steel mixing tank fitted with an impeller-type stirrer are poured 31,180 parts of water, 5,820 parts of sodium acid pyrophosphate, and 2,000 parts of commercial hydrated lime [$Ca(OH)_2$]. The molar ratio of sodium acid pyrophosphate to calcium hydroxide in this mixture is about 0.97. The resulting slurry is then heated to 50° C. Within about 10 minutes the pH of the slurry has become steady at about 9. Small final adjustments of the slurry pH to the desired level are made by the addition of small quantities of lime or sodium acid pyrophosphate. The reaction is complete when the pH of the slurry has remained steady for about one-half hour after the last addition of raw materials.

After the reaction of sodium acid pyrophosphate and calcium hydroxide is completed, the water in the slurry is driven off by drying the slurry on a conventional 36-inch diameter splash-feed stainless steel drum dryer under an 80 pound head of steam, at a drum speed of 6 r.p.m. The resulting dried product contains about 20 weight percent of water as water of hydration, and is largely amorphous (i.e. >50 weight percent is amorphous), according to X-ray spectographic analysis. It contains many loosely agglomerated lumps, which are easily broken when the dried product is passed once through a conventional hammer mill.

The beneficial use (as an anti-caking agent for MCP) of calcium disodium pyrophosphate tetrahydrate produced in this example is illustrated in Example II.

EXAMPLE II

One thousand parts of powdered commercial monocalcium orthophosphate monohydrate are blended in a conventional ribbon-type mixer for about 15 minutes with 15 parts of the finely divided amorphous calcium disodium pyrophosphate tetrahydrate which has been produced as in Example I, above. Thirty grams of the resulting blend are placed loosely in a 3-cm. by 3½ cm. rigid-walled cylinder and are then covered (top and bottom) with moisture-permeable cloth. The sample is then held for 48 hours at 90° F. in an 80 percent relative humidity atmosphere and under 6.7 p.s.i. (guage) pressure, in order to test its resistance to caking. Table I lists the results of this test. Note that the results are given in terms of "caking numbers," which represent the pounds of force, applied at a uniform rate of increase (one additional pound of force applied each second), directly onto the entire top surface of the cake of MCP (after it is removed from the above-described cylinder) by means of a 3.5 cm. diameter flat disc. The "caking numbers" are average values from analyses made in triplicate. Table I also contains "caking number" data for other forms of calcium disodium pyrophosphate, for magnesium disodium pyrophosphate, and for materials which are known to function as anti-caking agents or flow conditioners for materials other than mono-calcium orthophosphate monohydrate (MCP).

Table I
"CAKING NUMBERS" FOR VARIOUS ANTI-CAKING AGENTS

| Agent | Concentration in MCP | |
|---|---|---|
| | 1% | 2% |
| (a) Calcium disodium pyrophosphate tetrahydrate (largely amorphous, from Example I) | 7 | 3 |
| (b) Calcium disodium pyrophosphate tetrahydrate (crystalline) [1] | 10 | 5 |
| (c) Calcium disodium pyrophosphate, anhydrous (amorphous) [2] | 10 | 4 |
| (d) Magnesium disodium pyrophosphate, anhydrous (amorphous) [3] | 15 | 6 |
| (e) Commercial powdered tricalcium orthophosphate (commercial "flow-conditioner") [4] | | 36 |
| (f) Microcrystalline tricalcium orthophosphate [5] | | 32 |
| (g) Sodium silico aluminate (commercial "flow-conditioner") | 21 | 11 (dusty) |
| (h) None (control) | 45 | |

[1] Average particle size=<10μ. Made by reacting sodium acid pyrophosphate with calcium chloride, filtering, washing with water, drying, and grinding.
[2] Agent (b), dried at 250° C. to remove water of crystallization. Average particle size=<10μ.
[3] Same as agent (b), except made with $MgCl_2$. Average particle size=<10μ.
[4] Average particle size=<10μ.
[5] Average particle size=<1μ.

Note that the above test is a very severe one, and that as a rule, those anti-caking agents that give "caking numbers" less than about 20 are at least commercially acceptable, and would be expected to perform at least reasonably satisfactory as anti-caking agents for MCP under ordinary conditions of shipping, storage, and handling. The above date illustrates the unexpected superiority of the compositions and processes of this invention over products which are presently commercially recommended and used for this purpose.

What is claimed is:

1. A process for manufacturing a particulated monocalcium orthophosphate monohydrate composition which is resistant to caking, which process comprises intermixing with said monocalcium orthophosphate monohydrate from about 0.5 to about 10 weight percent, based on the weight of the resulting mixture, of a finely divided mixed cation pyrophosphate having the formula $MA_2P_2O_7$, wherein M is an alkaline earth metal cation and A is an alkali metal cation, whereby the normal tendency of said monocalcium orthophosphate monohydrate to cake is inhibited; at least about 70 weight percent of the particles of said finely divided mixed cation pyrophosphate being small enough to pass through a U.S. Standard 325 mesh screen.

2. A process as in claim 1 wherein said alkaline earth metal cation is selected from the group consisting of calcium and magnesium, and said alkali metal cation is sodium.

3. A process as in claim 2 wherein said mixed cation pyrophosphate is calcium disodium pyrophosphate tetrahydrate at least about 50 weight percent of said calcium disodium pyrophosphate tetrahydrate being amorphous.

4. A process for manufacturing a particulated monocalcium orthophosphate monohyrate composition which is resistant to caking, which process comprises intermixing with said monocalcium orthophosphate monohydrate between 0.5 and about 10 weight percent of finely divided calcium disodium pyrophosphate having an average particle size below about 44 microns.

5. Particulated monocalcium orthophosphate monohydrate having intimately dispersed therein from about 0.5 to about 10 weight percent of finely divided mixed cation pyrophosphate having the formula $MA_2P_2O_7$, wherein M is an alkaline earth metal cation and A is an alkali metal cation; at least about 70 weight percent of the particles of said finely divided mixed cation pyrophosphate being small enough to pass through a U.S. Standard 325 mesh screen.

6. Particulated monocalcium orthophosphate monohydrate having intimately dispersed therein from about 0.5 to about 10 weight percent of finely divided calcium disodium pyrophosphate; at least about 70 weight percent of the particles of said finely divided calcium disodium pyrophosphate being small enough to pass through a U.S. Standard 325 mesh screen.

7. Particulated monocalcium orthophosphate monohydrate having intimately dispersed therethrough from about 0.5 to about 10 weight percent of finely divided magnesium disodium pyrophosphate; at least about 70 weight percent of the particles of said finely divided calcium disodium pyrophosphate being small enough to pass through a U.S. Standard 325 mesh screen.

8. Particulated monocalcium orthophosphate monohydrate having between about 0.50 and about 7 weight percent of finely divided calcium disodium pyrophosphate tetrahydrate having an average particle size below about 44 microns interdispersed over the surfaces of the particles of said monocalcium orthophosphate monohydrate; at least about 70 weight percent of said calcium disodium pyrophosphate tetrahydrate being amorphous.

9. A process for manufacturing a particulated monocalcium orthophosphate monohydrate composition which is resistant to caking, which process comprises intermixing with said monocalcium orthophosphate monohydrate a mixture comprising a finely divided mixed cation pyrophosphate having the formula $MA_2P_2O_7$; wherein M is an alkaline earth metal cation and A is an alkali metal cation; and up to about 60 weight percent, based on the weight of said mixed cation pyrophosphate of a finely divided inorganic siliceous material, whereby the normal tendency of said monocalcium orthophosphate monohydrate to cake is inhibited; at least about 70 weight percent of the particles of said finely divided mixed cation pyrophosphate and of said finely divided inorganic siliceous material being small enough to pass through a U.S. Standard 325 mesh screen, and the amount of said mixture being from about 0.5 to about 10 weight percent, based on the weight of said monocalcium orthophosphate monohydrate.

10. Particulated monocalcium orthophosphate monohydrate having interdispersed over the surface of its particles between about 0.5 and about 7 weight percent of a finely divided mixture comprising calcium disodium pyrophosphate tetrahydrate, and up to about 60 weight percent, based on the weight of said calcium disodium pyrophosphate tetrahydrate, of a finely divided inorganic siliceous material; at least about 70 weight percent of said calcium disodium pyrophosphate tetrahydrate being amorphous and the average diameter of the particles of both said inorganic siliceous material and said calcium disodium pyrophosphate tetrahydrate being less than about 44 microns.

References Cited by the Examiner

UNITED STATES PATENTS

| | | | |
|---|---|---|---|
| 990,699 | 4/1911 | Brown et al. | 23—109 |
| 1,883,447 | 10/1932 | Ammen | 23—107 X |
| 2,093,927 | 9/1937 | Preston | 23—106 X |
| 2,272,014 | 2/1942 | Knox | 23—108 |
| 2,287,699 | 6/1942 | Moss et al. | 23—109 |
| 2,291,608 | 8/1942 | Cobbs et al. | 23—105 X |
| 2,291,609 | 8/1942 | Cobbs et al. | 23—108 X |
| 2,365,438 | 12/1944 | Schilb | 252—385 X |
| 2,468,448 | 4/1949 | King | 252—385 X |
| 2,589,272 | 3/1952 | Miller | 23—108 |
| 2,712,529 | 7/1955 | Mills et al. | 23—106 X |
| 2,728,732 | 12/1955 | Arnett et al. | 252—383 |
| 2,749,278 | 6/1956 | Moss | 23—108 X |
| 2,866,760 | 12/1958 | Haessler et al. | 252—383 |
| 2,962,354 | 11/1960 | Edwards | 23—106 |
| 3,012,852 | 12/1961 | Nelson | 23—109 |
| 3,066,056 | 11/1962 | Schlaeger et al. | 23—108 |
| 3,125,434 | 3/1964 | Smith et al. | 23—106 X |

OTHER REFERENCES

Van Wazer: Phosphorus and Its Compounds, volume 1, page 628.

MAURICE A. BRINDISI, *Primary Examiner.*